(12) United States Patent
Kwon et al.

(10) Patent No.: US 8,872,791 B2
(45) Date of Patent: Oct. 28, 2014

(54) TOUCH SENSING DEVICE AND METHOD THEREOF

(75) Inventors: Yong Il Kwon, Gyunggi-do (KR); Hyun Suk Lee, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 119 days.

(21) Appl. No.: 13/334,405

(22) Filed: Dec. 22, 2011

(65) Prior Publication Data

US 2013/0100069 A1 Apr. 25, 2013

(30) Foreign Application Priority Data

Oct. 21, 2011 (KR) .................... 10-2011-0108015

(51) Int. Cl.
*G06F 3/045* (2006.01)
*G06F 3/041* (2006.01)
*G06F 3/044* (2006.01)

(52) U.S. Cl.
CPC ..................... *G06F 3/044* (2013.01)
USPC .......................... 345/174; 345/173

(58) Field of Classification Search
CPC ......... G01R 27/26; G01R 19/00; G06F 3/044
USPC ............. 345/156–174; 324/658, 679; 341/20, 341/143
See application file for complete search history.

(56) References Cited

U.S. PATENT DOCUMENTS

2007/0257890 A1* 11/2007 Hotelling et al. ............. 345/173
2010/0212975 A1   8/2010 Moon et al.
2010/0253550 A1* 10/2010 Lin et al. ...................... 341/20
2011/0122087 A1   5/2011 Jang et al.
2011/0134076 A1*  6/2011 Kida et al. .................... 345/174
2011/0279131 A1* 11/2011 Kim et al. ..................... 324/679
2012/0043973 A1*  2/2012 Kremin ........................ 324/658

FOREIGN PATENT DOCUMENTS

| KR | 10-2007-0057565 | | 6/2007 | |
| KR | 10-2010-0019810 | | 2/2010 | |
| KR | 10-2010-0121605 | | 11/2010 | |
| KR | 10-2011-0057501 | | 6/2011 | |
| WO | WO 2009/085727 | | 7/2009 | |
| WO | WO2009/085727 | * | 7/2009 | ............. G01R 27/26 |
| WO | WO2009/085727 A2 | * | 7/2009 | ............. G01R 27/26 |

OTHER PUBLICATIONS

AD7843 Touch Screen Digitizer, Specification Sheet, Analog Devices Inc., 2004.*
AD7142 Programmable Controller for Capacitance Touch Sensors, Specification Sheet, Analog Devices Inc., 2007.*
Korean Office Action issued May 20, 2013 in corresponding Korean Patent Application No. 10-2011-0108015.
Korean Office Action mailed Nov. 29, 2013 in related Korean Application No. 10-2011-0108015.

* cited by examiner

*Primary Examiner* — Kent Chang
*Assistant Examiner* — Herbert L Hagemeier (57) ABSTRACT

There are provided a touch sensing device and a method thereof. The touch sensing device, including: a plurality of sensing circuit units measuring capacitance variations from a plurality of sensing electrodes; at least one TDC circuit connected with the plurality of sensing circuit units to convert the capacitance variations into digital signals; a calculating unit judging a touch from the digital signals; and a delay circuit sequentially receiving the capacitance variations from the plurality of sensing circuit units.

8 Claims, 8 Drawing Sheets

TOUCH SENSING DEVICE AND METHOD THEREOF

CROSS-REFERENCE TO RELATED APPLICATIONS

This application claims the priority of Korean Patent Application No. 10-2011-0108015 filed on Oct. 21, 2011, in the Korean Intellectual Property Office, the disclosure of which is incorporated herein by reference.

BACKGROUND OF THE INVENTION

1. Field of the Invention

The present invention relates to a touch sensing device and a method thereof that can accurately sense touches generated in a plurality of sensing electrodes with one or a small number of signal converting units, by sequentially detecting sensed signals.

2. Description of the Related Art

Touch sensing devices such as a touch screen, a touch pad, and the like, as input devices attached to a display apparatus to provide an intuitive input method to a user, have been widely applied to a variety of electronic apparatuses such as a cellular phone, a personal digital assistant (PDA), a vehicle navigation unit, and the like, in recent years. In particular, recently, with an increase in demand for smart phones, the rate at which touch screens have been adopted as touch sensing device elements capable of providing various input methods in a limited form factor has increased on a day by day basis.

Touch screens adopted in portable apparatuses may be largely classified into resistive type and capacitive type touch screens, according to a touch sensing method. Since capacitive type touch screens have advantages, in that they may have an extended life-span, and various input methods and gestures can be easily implemented therein, and thus, the adoption rate thereof has steadily increased. In particular, it is easier to implement a multi-touch interface in a capacitive type touch screen than in a resistive type touch screen, and as a result, the capacitive type touch screen is widely applied to electronic apparatuses, such as smart phones, and the like.

The capacitive type touch screen is constituted by a sensing circuit for detecting variations in capacitance generated from an electrode and a signal processor determining touches by signal-processing the variations in capacitance detected by the sensing circuit. However, due to the characteristics of the touch screen primarily applied to portable apparatuses, hardware space provided for the touch screen is limited, and power consumed by the touch screen cannot but be limited to a predetermined range for efficient power management of the overall portable apparatus. Accordingly, connecting a plurality of respective signal processors to the sensing circuits, themselves individually connected to a plurality of electrodes, may cause a problem in terms of limited form factor and power management.

SUMMARY OF THE INVENTION

An aspect of the present invention provides a touch sensing device and a method thereof that can judge touches with a small number of signal converting units by sequentially receiving and signal-processing variations in capacitance from a plurality of sensing circuits.

According to an aspect of the present invention, there is provided a touch sensing device, including: a plurality of sensing circuit units measuring capacitance variations from a plurality of sensing electrodes; at least one TDC circuit connected with the plurality of sensing circuit units to convert the capacitance variations into digital signals; a calculating unit judging a touch from the digital signals; and a delay circuit sequentially receiving the capacitance variations from the plurality of sensing circuit units.

The delay circuit may set predetermined delay times for the plurality of individual sensing circuit units, based on a time required for the TDC circuit to generate the digital signals and characteristics of the capacitance variations.

The delay circuit may set different delay times for the plurality of individual sensing circuit units.

The plurality of sensing circuit units may measure mutual-capacitance variations generated among the plurality of sensing electrodes.

According to another aspect of the present invention, there is provided a touch sensing device, including: a plurality of sensing circuit units measuring capacitance variations; at least one signal converting unit connected with the plurality of sensing circuit units to generate digital signals from the capacitance variations; a calculating unit judging a touch from the digital signals; and a delay circuit setting different delay times for the plurality of individual sensing circuit units connected with the signal converting unit, in order to sequentially receive the capacitance variations, wherein the delay times are set based on a time required for the signal converting unit to generate the digital signals and characteristics of the capacitance variations.

The touch sensing device may further include a panel section in which a plurality of sensing electrodes, electrically connected with the plurality of sensing circuit units, are provided.

The sensing circuit units may measure mutual-capacitance variations generated among the plurality of sensing electrodes.

The signal converting unit may include a time-to-digital converter (TDC) circuit measuring a time required for a voltage signal corresponding to the capacitance variation to be varied to have a predetermined reference voltage.

The delay circuit may set the delay times by considering a time difference between a minimum time and a maximum time required for the voltage signal to be varied to have the predetermined reference voltage, in accordance with characteristics of capacitance variations.

The touch sensing device may further include a switching circuit controlling connections between the plurality of sensing circuit units and the signal converting unit, in accordance with the delay times set for the plurality of individual sensing circuit units.

The calculating unit may judge the touch by using a weighted average of the digital signals.

According to another aspect of the present invention, there is provided a touch sensing method, including: measuring a plurality of capacitance variations from a plurality of sensing electrodes; generating digital signals by sequentially receiving the plurality of capacitance variations; and judging a touch based on the digital signals, wherein, in the generating of the digital signals, the plurality of capacitance variations are sequentially received based on times required to generate the digital signals and characteristics of the plurality of capacitance variations.

The generating of the digital signals may include converting the plurality of capacitance variations into a plurality of voltage signals; measuring a first time required for each of the plurality of voltage signals to be varied to have a predetermined reference voltage; and converting the first time into the digital signals.

The generating of the digital signals may further include setting delay times for sequentially receiving the plurality of capacitance variations, based on a time difference between a minimum value and a maximum value of the first time.

The delay times may be differentially applied to the plurality of sensing electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Embodiments described in the specification and structures illustrated in drawings are merely exemplary embodiments of the present invention. Thus, it is intended that the present invention covers the modifications and variations of this invention, provided they fall within the scope of their equivalents at the time of filing this application Like reference numerals designate like components having substantially the same constitution and function in the drawings of the present invention.

Hereinafter, embodiments of the present invention will be described in detail with reference to the accompanying drawings so that those skilled in the art may easily practice the present invention.

Figure 1:
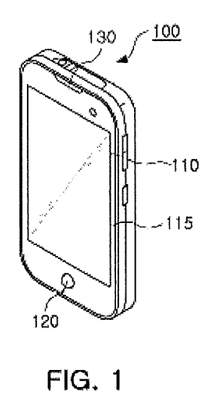
FIG. 1 is a perspective view showing an exterior of an electronic apparatus including a touch sensing device according to an embodiment of the present invention.

FIG. 1 is a view showing an exterior of an electronic apparatus including a touch sensing device according to an embodiment of the present invention. Referring to FIG. 1, an electronic apparatus 100 according to an embodiment of the present invention includes a display device 110 for outputting an image, an input unit 120, and an audio unit 130 for outputting voice, and may include a touch sensing device which is integrated with the display device 110.

As shown in FIG. 1, in the case of a mobile apparatus, the touch sensing device is generally provided integrally with the display device, and the touch sensing device should have a high level of light transmittance for the image displayed by the display device to penetrate the touch sensing device. Therefore, the touch sensing device maybe realized by forming a sensing electrode made of a material which is transparent and has electrical conductivity, such as indium-tin oxide (ITO), indium zinc oxide (IZO), zinc oxide (ZnO), carbon nano tube (CNT), or graphene, on a base substrate made of a transparent film material such as polyethylene terephthalate (PET), polycarbonate (PC), polyethersulfone (PES), polyimide (PI), or the like. A wiring pattern connected with the sensing electrode made of the transparent conductive material is placed in a bezel area 115 of the display device. Since the wiring pattern is visually shielded by the bezel area 115, the wiring pattern may be made of even a metallic material such as silver (Ag) or copper (Cu).

In a case in which the touch sensing device according to the embodiment of the present invention may not be provided integrally with the display device, such as in the case of a notebook computer touch pad, the touch sensing device may be manufactured by simply patterning the sensing electrode on a circuit board with metal. However, for convenience of explanation, a touch sensing device and a method thereof according to embodiments of the present invention will be described on the assumption of a touch screen.

Figure 2:
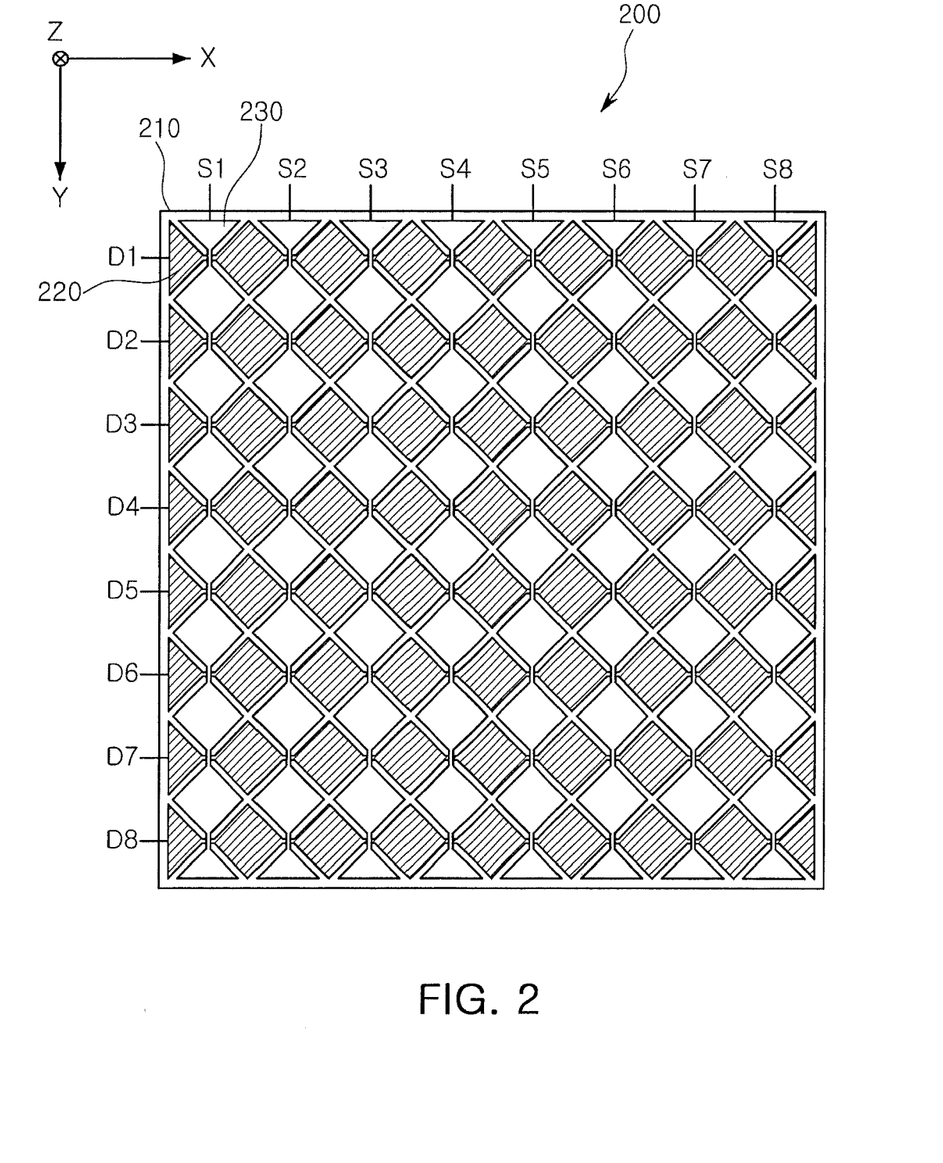
FIG. 2 is a plan view showing a touch sensing panel electrically connected with a touch sensing device according to an embodiment of the present invention.

FIG. 2 is a plan view showing a touch sensing panel electrically connected with a touch sensing device according to an embodiment of the present invention.

Referring to FIG. 2, a touch sensing panel 200 according to this embodiment includes a substrate 210 and a plurality of sensing electrodes 220 and 230 provided on the substrate 210. Although not shown in FIG. 2, each of the plurality of sensing electrodes 220 and 230 may be electrically connected with the wiring pattern of the circuit board attached to one end of the substrate 210 through a wire and a bonding pad. A controller integrated circuit is mounted on the circuit board to detect signals generated from the plurality of sensing electrodes 220 and 230 and judge the touch based thereon.

In the touch screen device, the substrate 210 may be a transparent substrate in which the sensing electrodes 220 and 230 can be formed and may be formed of a plastic material such as polyimide (PI), polymethylmethacrylate (PMMA), polyethyleneterephthalate (PET), or polycarbonate (PC) or tempered glass. Further, apart from an area in which the sensing electrodes 220 and 230 are formed, a predetermined printing area for the wire connected with the sensing electrodes 220 and 230 may be formed on the substrate 210 in order to visually shield the wire formed of an opaque metallic material.

The plurality of sensing electrodes 220 and 230 may be provided on one surface or both surfaces of the substrate 210. In the case of the touch screen device, the plurality of sensing electrodes 220 and 230 may be formed of a transparent conductive material such as indium-tin oxide (ITO), indium zinc-oxide (IZO), zinc oxide (ZnO), carbon nano tube (CNT), or a graphene based material. Although the sensing electrodes 220 and 230 have a rhombus, or diamond-shaped, pattern as shown in FIG. 2, the sensing electrodes 220 and 230 may have various patterns using polygonal shapes such as a rectangle, a triangle, and the like.

The plurality of sensing electrodes 220 and 230 include first electrodes 220 extending in an X-axis direction and second electrodes 230 extending in a Y-axis direction. The first and second electrodes 220 and 230 may be provided on both surfaces of the substrate 210 or provided on different substrates to intersect each other. In the case in which both the first and second electrodes 220 and 230 are provided on one surface of the substrate 210, a predetermined insulating layer may be partially formed at an intersecting point between the first and second electrodes 220 and 230.

A touch sensing device that is electrically connected with the plurality of sensing electrodes 220 and 230 to sense a touch detects capacitance variations sensed in the plurality of sensing electrodes 220 and 230 and senses the touch therefrom. The first electrodes 220 are connected to channels defined as D1 to D8 in the controller integrated circuit to receive predetermined driving signals, and the second electrodes 230 are connected to channels defined as S1 to S8 to be used in order for the controller integrated circuit to detect sensed signals. In this case, the controller integrated circuit may detect mutual-capacitance variations generated between the first and second electrodes 220 and 230 as the sensed signals, and may sequentially apply the driving signals to the individual first electrodes 220 and simultaneously detect capacitance variations from the second electrodes 230.

Figure 3:
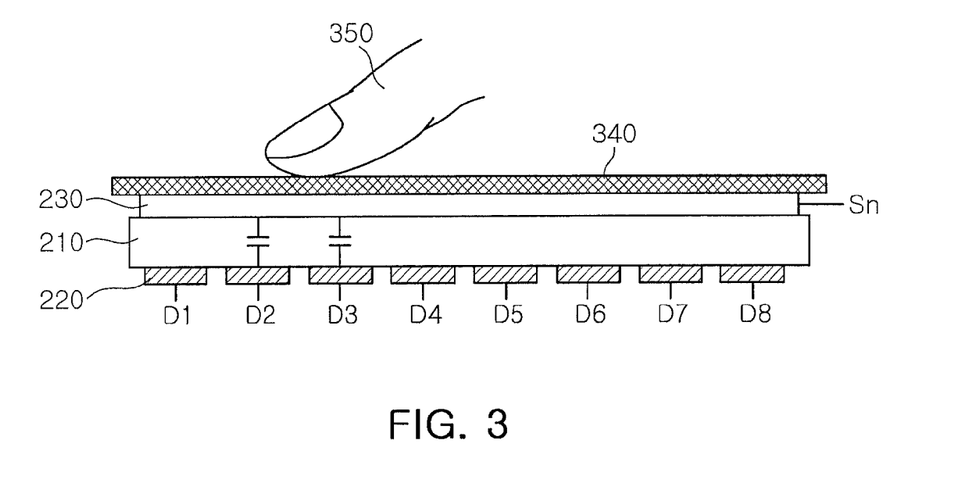
FIG. 3 is a cross-sectional view of the touch sensing panel shown in FIG. 2.

FIG. 3 is a cross-sectional view of the touch sensing panel shown in FIG. 2.

FIG. 3 is a cross-sectional view of the touch sensing panel 200 shown in FIG.2 taken in a Y-Z direction. The touch sensing panel 200 may further include a cover lens 340 receiving the touch, in addition to the substrate 210 and the plurality of sensing electrodes 220 and 230 described in FIG. 2. The cover lens 340 is provided on the second electrodes 230 used to detect the sensed signals such that it may receive the touch from a touching object 350 such as a finger.

When the driving signals are sequentially applied to the first electrodes 220 through the channels D1 to D8, mutual-capacitance is generated between the first and second electrodes 220 and 230. When the driving signals are sequentially applied to the first electrodes 220, a capacitance variation may occur between the first and second electrodes 220 and 230 adjacent to an area contacted by the touching object 350. The capacitance variation may be proportionate to a dimension of an area overlapped among the touching object 350, the first electrodes 220 applied with the driving signals and the second electrodes 230. In FIG. 3, the mutual-capacitance generated between the first and second electrodes 220 and 230 connected to the channels D2 and D3 is influenced by the touching object 350.

Figure 4:
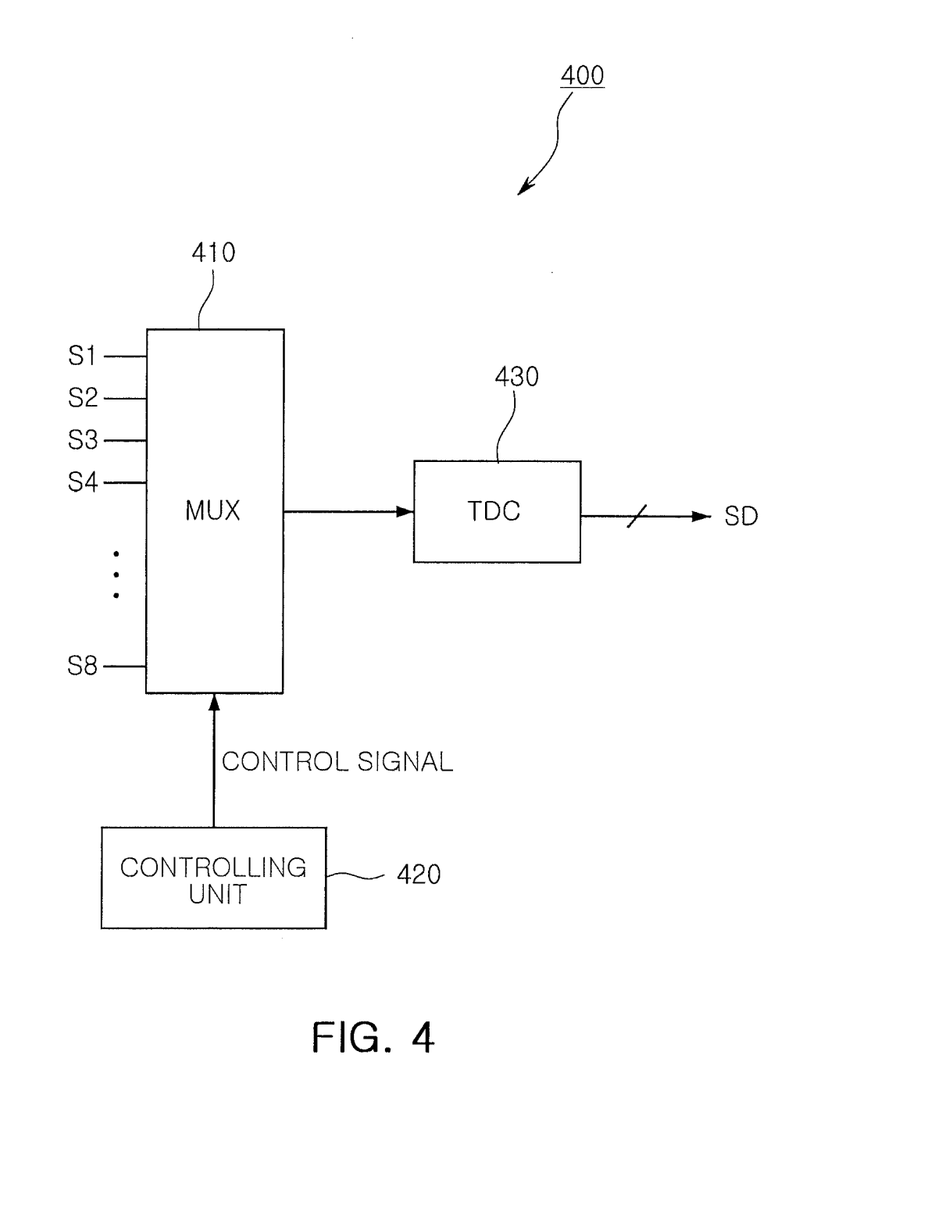
FIG. 4 is a block diagram of a touch sensing device according to an embodiment of the present invention.

FIG. 4 is a block diagram of a touch sensing device according to an embodiment of the present invention.

Referring to FIG. 4, a touch sensing device 400 according to an embodiment of the invention may include a switching circuit 410, a controlling unit 420 generating a control signal with respect to the switching circuit 410, and a signal converting unit 430. For convenience of explanation, although not shown in FIG. 4, the touch sensing device 400 may include a sensing circuit unit for detecting the sensed signals generated in the plurality of sensing electrodes, and for example, the sensing circuit unit may detect capacitance variations generated in the second electrodes 220 through the channels S1 to S8. The sensed signals detected by the sensing circuit unit are inputted into the switching circuit 410, and the switching circuit 410 selects at least some of the inputted sensed signals and transfers the selected sensed signals to the signal converting unit 430.

The switching circuit 410 may be a multiplexer circuit MUX capable of selecting at least some, preferably one sensed signal from the plurality of sensed signals which are inputted as described above. In this case, the sensed signal which the switching circuit 410 transfers to the signal converting unit 430 may be selected by the control signal generated by the controlling unit 420.

The signal converting unit 430 converts the sensed signal transferred from the switching circuit 410 to a digital signal SD and outputs it. The capacitance variation generated in the plurality of sensing electrodes 220 and 230 is converted into a predetermined analog signal, for example, a voltage signal in the sensing circuit unit to be supplied to the switching circuit 410. To this end, the sensing circuit unit may include an integral circuit for generating the voltage signal from the capacitance variation and may supply the voltage signal depending on the capacitance variation to the switching circuit 410.

Assuming that the driving signal is sequentially applied to the plurality of first electrodes 220 and the capacitance variation is detected from the plurality of second electrodes 230 in the channels S1 to S8 as the sensed signal simultaneously, a total of eight sensed signals detected in the sensing circuit unit should be inputted into the signal converting unit 430 simultaneously. In this case, the signal converting unit 430 needs to sequentially receive the sensed signals detected in the channels S1 to S8 in order to process the plurality of sensed signals detected by the sensing circuit unit.

In the signal converting unit 430 that converts the voltage signal generated by the sensing circuit unit into the digital signal SD in a method of measuring the magnitude of a voltage level varying for a predetermined reference time, since a sample & hold function may be implemented in the signal converting unit 430, the plurality of sensed signals may be sequentially inputted without adding a particular constituent element. However, in the case of the signal converting unit 430 that generates the digital signal SD in a method of measuring a time required for the voltage signal to be varied to have a predetermined reference voltage level, it is very difficult to implement the sample & hold function in the signal converting unit 430, and accordingly, the switching circuit 410 shown in FIG. 4 may be necessary.

That is, since the switching circuit 410 sequentially transfers the plurality of sensed signals to the signal converting unit 430, the digital signal SD may be generated without a loss of the sensed signal even if an additional sample & hold function is not implemented in the signal converting unit 430. However, since the plurality of signals are simultaneously inputted to the switching circuit 410 through the channels S1 to S8, it is very difficult to convert the plurality of sensed signals that are simultaneously detected into the digital signals SD by merely adding the switching circuit 410. Therefore, a circuit configuration for sequentially inputting the plurality of sensed signals into the switching circuit 410 is required. Hereinafter, the circuit configuration will be described with reference to FIG. 5.

Figure 5:
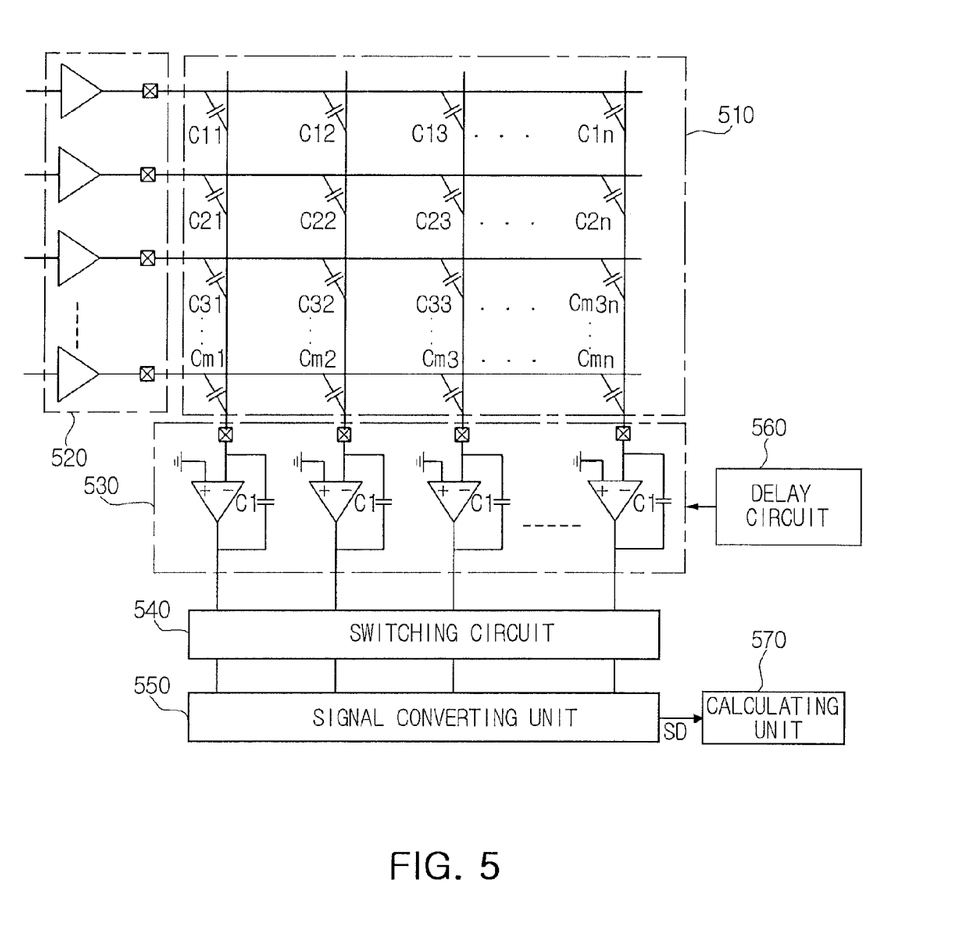
FIG. 5 is a circuit diagram illustrating an operation of a touch sensing device according to an embodiment of the present invention.

FIG. 5 is a circuit diagram illustrating an operation of a touch sensing device according to an embodiment of the present invention.

Referring to FIG. 5, the touch sensing device according to the embodiment of the present invention includes a panel section 510 in which a plurality of sensing electrodes are provided, a driving circuit unit 520 applying a driving signal to the panel section 510, a sensing circuit unit 530 detecting the sensed signals generated from the panel section 510, a switching circuit 540, a signal converting unit 550, a delay circuit 560, and a calculating unit 570.

As shown in FIG. 5, the panel section 510 includes the plurality of sensing electrodes intersecting each other, that is, first electrodes extending in a horizontal direction and second electrodes extending in a vertical direction. Mutual-capacitances $C_{11}$ to $C_{mn}$ are formed between the first electrodes receiving the driving signals from the driving circuit unit 520 and the second electrodes intersecting the first electrodes receiving the driving signals. As described above, the sensing circuit unit 520 may detect the amount of variations in the mutual-capacitances C11 to Cmn by the dimension of the area generated by the touch. Hereinafter, for convenience of explanation, it is assumed that a total of m first electrodes and n second electrodes are included in the panel section 510.

The sensing circuit unit 520 includes integral circuits as shown in FIG. 5. The integral circuit may include an operational amplifier and a capacitor C1 and convert the mutual-capacitances C11 to Cmn into the voltage signal and transfers the converted voltage signal to the switching circuit 540. The sensing circuit unit 520 may include a total of n integral circuits to correspond to the plurality of second electrodes, respectively. An operation of each integral circuit may be controlled by the delay circuit 560 so that the voltage signals generated from the n integral circuits are sequentially transferred to the switching circuit 540, respectively.

As described above, when the signal converting unit 550 generates the digital signal SD, which the calculating unit 570 requires, by measuring the time required for the plurality of voltage signals generated by the sensing circuit unit 530 to be varied to have a predetermined voltage level, it is difficult to implement the sample & hold function in the signal converting unit 550, and accordingly, the signal converting unit 550 needs to sequentially receive the plurality of sensed signals. To this end, in the present embodiment, timings of the generation of the voltage signals from the plurality of integral circuits are controlled to be different from each other by using the delay circuit 560, and the timings may be synchronized with timings of the connection of the switching circuit 540 with the plurality of integral circuits. Hereinafter, the touch sensing device will be described in more detail with reference to FIG. 6.

Figure 6:
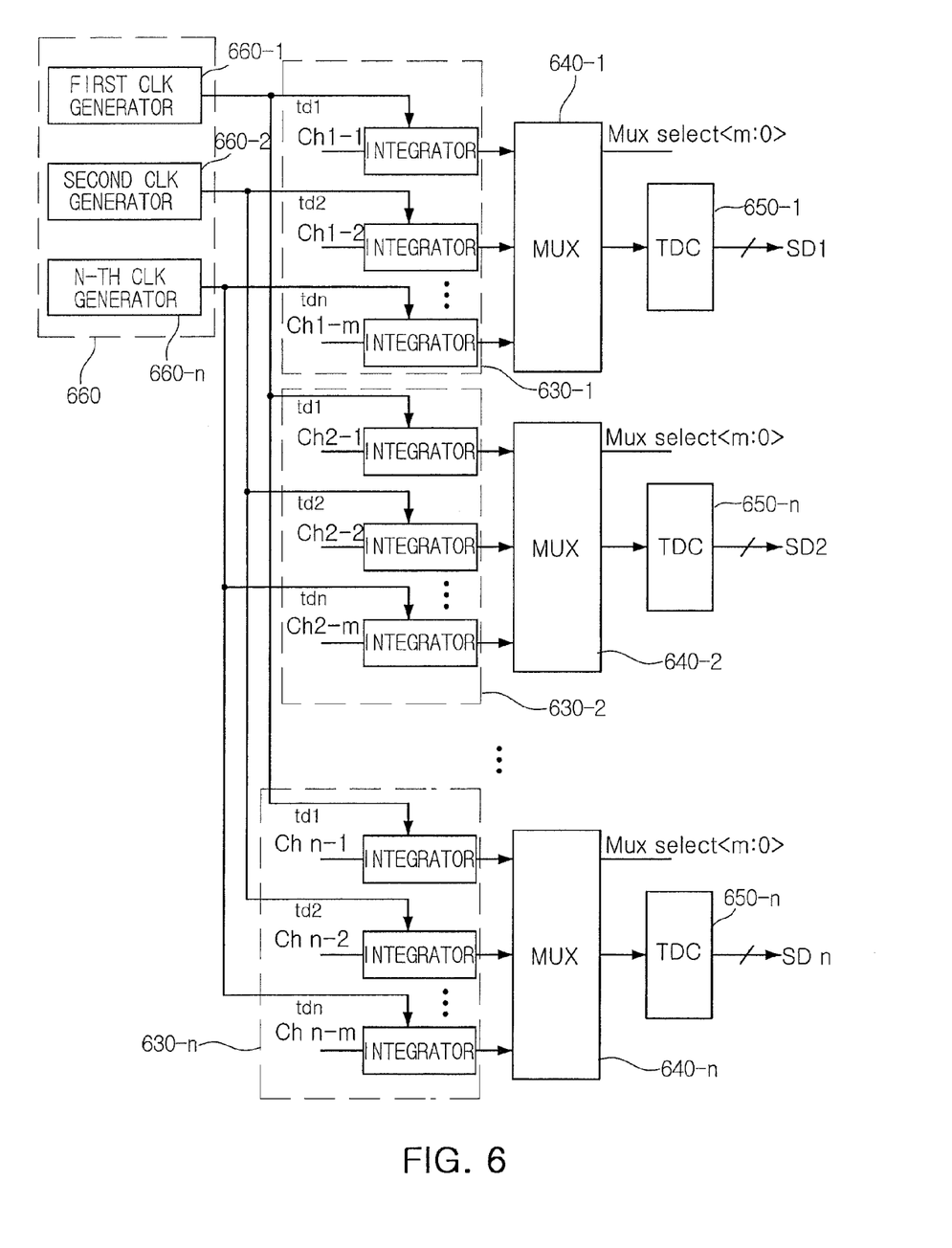
FIG. 6 is a block diagram of a touch sensing device according to an embodiment of the present invention.

FIG. 6 is a block diagram of a touch sensing device according to an embodiment of the present invention.

Referring to FIG. 6, the touch sensing device may include a sensing circuit unit 630 including integrators for detecting capacitance variations from a plurality of sensing electrodes, a signal converting unit 650 converting sensed signals detected by the integrators of the sensing circuit unit 630 into digital signals SD1 to SDn, and a switching circuit 640 and delay circuits 660-1 to 660-*n* controlling the sensed signals detected by the integrators of the sensing circuit unit 630 to be sequentially transferred to the signal converting unit 650. The delay circuits 660-1 to 660-*n* input different delay signals td1 to tdn to the integrators of the sensing circuit unit 630, respectively.

When the driving signal is applied to a first-row first electrode in the panel section 510 of the touch sensing device shown in FIG. 5, the sensing circuit unit 630 detects the sensed signal from the second electrodes. N integrators included in the sensing circuit unit 630 detect C11 to C1*n* among the capacitances shown in FIG. 5 and convert the detected capacitances into the voltage signals. Similarly, when the driving signal is applied to a second-row first electrode, the sensing circuit unit 630 detects capacitance variations C21 to C2*n* from the second electrodes, and when the driving signal is applied to a last m-row first electrode, the sensing circuit unit 630 detects capacitance variations Cm1 to Cmn.

The detected capacitance variations are inputted into the signal converting unit 650 through the switching circuit 640 to be converted into the digital signals SD1 to SDn. The timings of the connection of the switching circuit 640 with the n integrators maybe synchronized with timings of the operation of the n integrators by receiving the delay signals td1 to tdn from the delay circuits 660-1 to 660-*n*. Hereinafter, an operation of the touch sensing device will be described with reference to FIG. 7.

Figure 7:
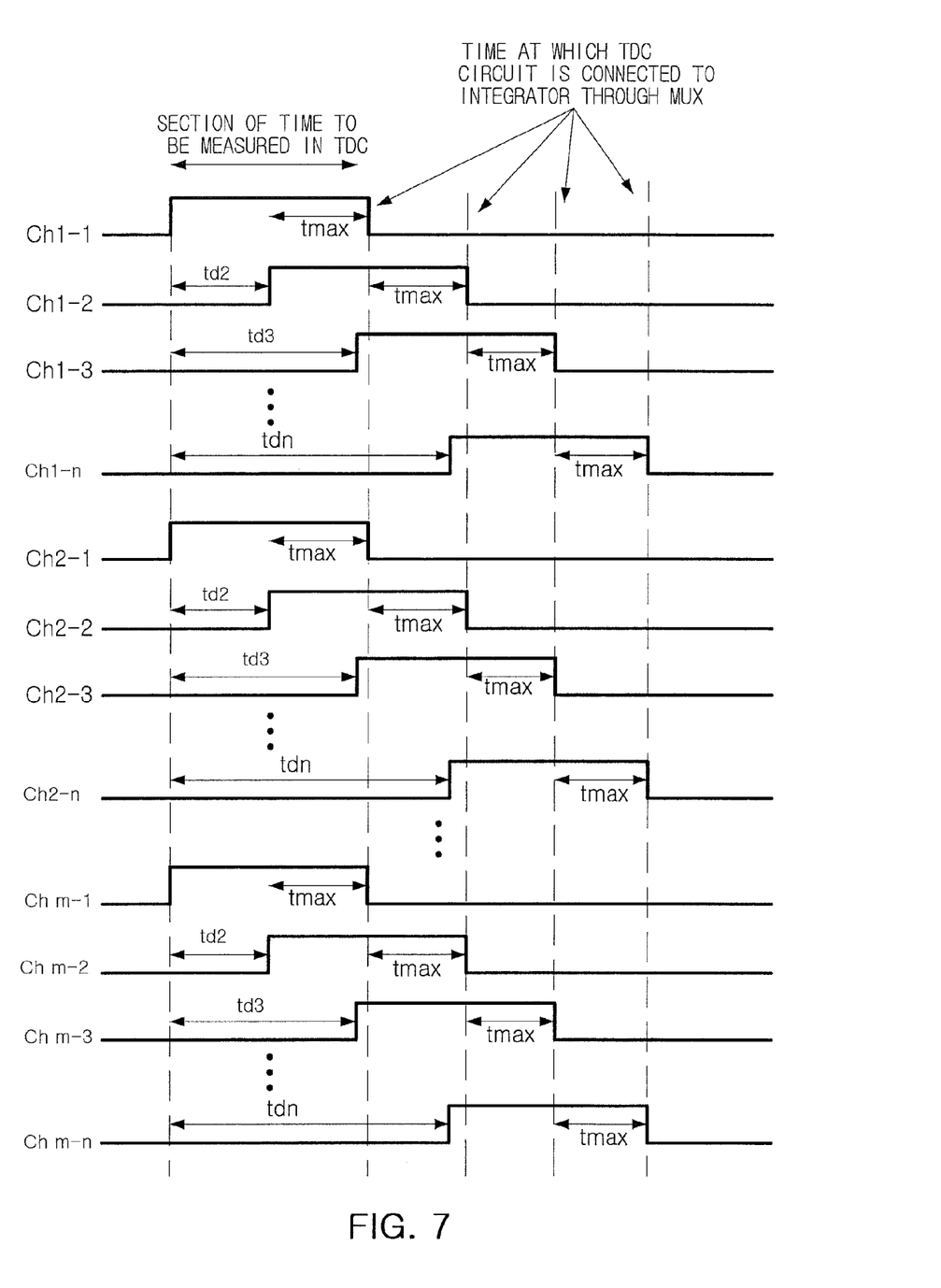
FIG. 7 is a timing diagram illustrating an operation of a touch sensing device according to an embodiment of the present invention.

FIG. 7 is a timing diagram illustrating an operation of a touch sensing device according to the embodiment of the present invention. Hereinafter, for convenience of explanation, it is assumed that the signal converting unit 650 is a time-to-digital converter (TDC) circuit that measures times required for the voltage signals detected by the integrators to be varied to have a predetermined reference voltage level to convert the times into digital signals SD1 to SDn.

Although a section in which the time should be measured may be the same across the channels in the TDC circuit, the capacitance variations generated by the touching object may be determined according to the dimension of the area overlapped among the sensing electrodes connected to each channel and the touching object, thereby being different in each channel. Therefore, the time required for the voltage signal as an analog signal which is a criterion to generate the digital signals SD1 to SDn to vary up to a predetermined level in the TDC circuit is different for each channel.

In FIG. 7, tmax refers to a time difference in which the time required for the voltage signal to be varied to have the predetermined voltage level is the greatest due to variations in capacitance barely being generated in the sensing electrodes. That is, when the variation in the level of the voltage signal detected by the integrator is measured for the time interval of tmax, the time required for the voltage signal to be varied to have the predetermined voltage level corresponds to tmax in the case in which the area contacted by the touching object actually has a large dimension, and thus, the sensed signals which can be converted into the digital signals SD1 to SDn may be sufficiently detected.

Meanwhile, in FIG. 7, a delay time given to each channel is defined as a value acquired by subtracting tmax from the section in which the TDC circuit in connection with each channel should measure the time. That is, when the driving signal is applied to the first-row first electrode, delay times td2 to tdn are sequentially given from the integrator connected with the second-row second electrode without giving the delay time to the integrator detecting the sensed signal from a first-row second electrode (td1 is defined as 0, td1=0). Consequently, as shown in FIG. 7, the sum of td2 and tmax is equivalent to the time required for the TDC circuit to convert the analog signal detected in the first-row second electrode into the digital signal.

The integrator that detects the capacitance variation from the first-row second electrode detects the capacitance variation by starting an operation thereof at the same time when the TDC circuit is connected to the integrator through the switching circuit 640. An integrator connected to a second-row second electrode detects the capacitance variation by starting an operation thereof after a delay time as long as td2 elapses, and the switching circuit 640 is connected to the integrator connected to the second-row second electrode after a time as long as td2+tmax elapses. As described above, the integrators generating the voltage signals by detecting the capacitance variations from the plurality of second electrodes are sequentially operated, and the switching circuit 640 is connected to an integrator connected to an n-th row second electrode with a delay time as long as tdn+tmax, and as a result, the TDC circuit may sequentially receive and process the sensed signals without needing to have the sample & hold function.

Cases Ch1-2, Ch2-2, and Chn-2 in which the signals are received from the second-row second electrode will be described below as an example. The TDC circuit is connected to the integrator through the switching circuit 640 at the same time when the integrator connected to the first-row second electrode starts the operation thereof. However, the TDC circuit is connected to the integrator connected to the first-row second electrode even at the time td2 when the integrator connected to the first-row second electrode starts the operation thereof, and the TDC circuit is connected to the integrator connected to the second-row second electrode after the time as long as td2+tmax elapses.

However, as described above, since the time difference between a minimum time and a maximum time required for the voltage signal generated in the integrator to reach a predetermined voltage signal is already set to tmax, the TDC circuit may detect an accurate time without a signal loss or error even when the TDC circuit is connected to the integrator connected to the second-row second electrode after the time as long as td2+tmax elapses. Consequently, the delay times td1 to tdn for the integrators generated in the delay circuit 660 may be determined by the time required for the TDC circuit to generate the digital signals and tmax depending on characteristics of the capacitance variations measured by the integrators.

Figure 8:
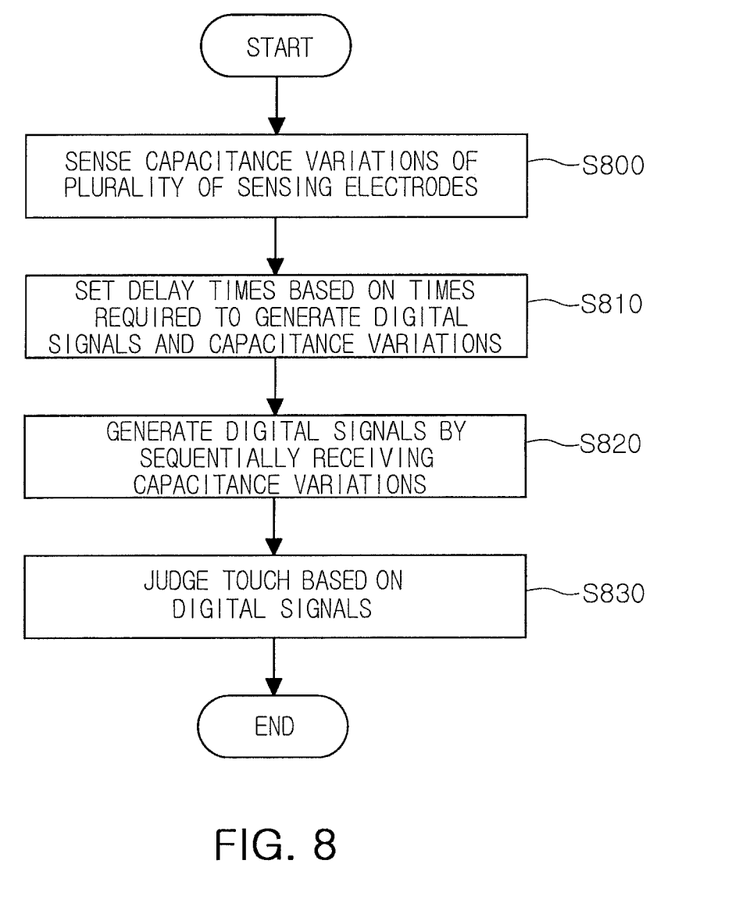
FIG. 8 is a flowchart illustrating a method of sensing a touch according to an embodiment of the present invention.

FIG. 8 is a flowchart illustrating a method of sensing a touch according to an embodiment of the present invention.

Referring to FIG. 8, a touch sensing method according to an embodiment of the present invention starts when capacitance variations are sensed from a plurality of sensing electrodes (S800). The voltage signals may be generated by sensing the capacitance variations in the integrators electrically connected to the plurality of sensing electrodes and the sensed capacitance variations may be mutual-capacitance variations generated among the plurality of sensing electrodes intersecting each other in the panel section 510.

When the sensing of the capacitance variations starts, the delay circuit 560 sets the delay times based on the times required to generate the digital signals and the capacitance variations (S810). As described above, the delay times may be differently given to the integrators connected to the plurality of sensing electrodes, respectively. Therefore, the times when the integrators start integration operations for generating the voltage signals from the capacitance variations are different and the method as described with reference to FIG. 7 may be applied thereto. That is, the operation of the switching circuit 540 is synchronized with those of the integrators whose operating times are controlled by the different delay times, such that one TDC circuit may convert the sensed signals generated in all the sensing electrodes into the digital signals.

The signal converting unit 550 sequentially receives the capacitance variations from the switching circuit 540 to generate the digital signals (S820). The signal converting unit 550 may be the TDC circuit and the capacitance variation inputted into the signal converting unit may be the analog signal converted into the voltage signal by the integrator. The signal converting unit 550 may include a delay cell circuit constituted by a plurality of buffers and latches to measure the time required for the voltage signal to reach the predetermined voltage level and convert the measured time into the digital signal.

The digital signal generated by the signal converting unit 550 is used to judge a touch by the calculating unit 570 (S830). The calculating unit 570 may judge input information including a position of the touch, the time at which the touch is applied, and a gesture by the touch from the digital signal, and transmit the input information to a main controller of an electronic apparatus.

As set forth above, according to embodiments of the present invention, sensed signals are sequentially signal-processed by setting different delay times for sensing circuit units detecting the sensed signals from a plurality of sensing electrodes to thereby judge a touch. Accordingly, a touch sensing device is constituted of a small number of circuit blocks and has a simple circuit configuration, and power consumption of the touch sensing device can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A touch sensing device, comprising:
   a plurality of sensing circuit units to measure capacitance variations from a plurality of sensing electrodes;
   at least one time-to-digital converter (TDC) circuit to sequentially receive the capacitance variations from the plurality of sensing circuit units to generate digital signals by measuring a time required for a voltage signal corresponding to a capacitance variation of the capacitance variations to be varied to have a predetermined reference voltage;
   a calculating unit to judge a touch from the digital signals;
   a delay circuit to control, using a plurality of predetermined delay time periods, individual circuit units of the plurality of sensing circuit units to detect the capacitance variations during different respective time periods,
   wherein a first of the plurality of predetermined delay time periods partialy overlaps a second of the plurality of predetermined delay time periods, and
   wherein a time period length of each of the the plurality of predetermined delay time periods is based on a time required for the at least one TDC circuit to generate the digital signals and a time difference between a minimum time and a maximum time required for the voltage signal to be varied to have the predetermined reference voltage; and
   a switching circuit to control connections between the plurality of sensing circuit units and the at least one TDC circuit in synchronization with the plurality of predetermined delay time periods.

2. The touch sensing device of claim 1, wherein the delay circuit sets different delay times for the plurality of individual sensing circuit units.

3. The touch sensing device of claim 1, wherein the plurality of sensing circuit units measure mutual-capacitance variations generated among the plurality of sensing electrodes.

4. The touch sensing device of claim 1, further comprising a panel section in which a plurality of sensing electrodes, electrically connected with the plurality of sensing circuit units, are provided.

5. The touch sensing device of claim 1, wherein the switching circuit controlling connections between the plurality of sensing circuit units and the TDC circuit, in accordance with the delay times set for the plurality of individual sensing circuit units.

6. The touch sensing device of claim 1, wherein the calculating unit judges the touch by using a weighted average of the digital signals.

7. A touch sensing method, comprising:
   measuring, using a plurality of sensing circuit units, a plurality of capacitance variations at different respective times from a plurality of sensing electrodes;
   generating digital signals by sequentially receiving, using a time-to-digital converter (TDC), the plurality of capacitance variations; and
   judging a touch based on the generated digital signals, controlling, using a plurality of predetermined delay time periods, individual circuit units of the plurality of sensing circuit units to detect the capacitance variations during different respective time periods,
  wherein a first of the plurality of predetermined delay time periods partialy overlaps a second of the plurality of predetermined delay time periods, and
  wherein a time period length of each of the the plurality of predetermined delay time periods is based on a time required for the at least one TDC circuit to generate the digital signals and a time difference between a minimum time and a maximum time required for the voltage signal to be varied to have the predetermined reference voltage; and
controlling, using a switching circuit, connections between the plurality of sensing circuit units and the at least one TDC circuit in synchronization with the plurality of predetermined delay time periods.

8. The touch sensing method of claim 7, wherein the delay times are differentially applied to the plurality of sensing electrodes.

* * * * *

UNITED STATES PATENT AND TRADEMARK OFFICE
CERTIFICATE OF CORRECTION

PATENT NO.         : 8,872,791 B2                                         Page 1 of 1
APPLICATION NO.    : 13/334405
DATED              : October 28, 2014
INVENTOR(S)        : Yong Il Kwon et al.

It is certified that error appears in the above-identified patent and that said Letters Patent is hereby corrected as shown below:

In the Claims

Column 10, Line 29, In Claim 1, delete "partialy" and insert -- partially --, therefor.

Column 10, Line 31, In Claim 1, before "plurality" delete "the", (second occurrence).

Column 11, Line 6, In Claim 7, delete "partialy" and insert -- partially --, therefor.

Column 11, Line 8, In Claim 7, before "plurality" delete "the", (second occurrence).

Signed and Sealed this
Fifth Day of May, 2015

Michelle K. Lee
*Director of the United States Patent and Trademark Office*